United States Patent [19]

McGovern

[11] Patent Number: 5,640,054
[45] Date of Patent: Jun. 17, 1997

[54] SABOT SEGMENT MOLDING APPARATUS AND METHOD FOR MOLDING A SABOT SEGMENT

[75] Inventor: John T. McGovern, Lancaster, Pa.

[73] Assignee: Primex Technologies, Inc., Red Lion, Pa.

[21] Appl. No.: 563,914

[22] Filed: Jun. 19, 1990

Related U.S. Application Data

[62] Division of Ser. No. 336,445, Mar. 10, 1989.

[51] Int. Cl.[6] .......................... C06B 21/00; F42B 14/06; B32B 9/00
[52] U.S. Cl. ........................ 264/3.1; 86/47; 428/408; 102/520
[58] Field of Search .......................... 86/17, 47; 264/3.1; 428/408; 102/520

[56] References Cited

U.S. PATENT DOCUMENTS

| | | | |
|---|---|---|---|
| 4,318,344 | 3/1982 | Price et al. | 102/520 |
| 4,420,440 | 12/1983 | Marz | 264/3 B |
| 4,459,894 | 7/1984 | Bunch | 102/520 |
| 4,507,165 | 3/1985 | Herring | 156/191 |
| 4,658,729 | 4/1987 | Scherbarth et al. | 102/520 |
| 4,747,191 | 5/1988 | Montier et al. | 29/1.23 |
| 4,776,281 | 10/1988 | Chiang et al. | 102/523 |

Primary Examiner—Peter A. Nelson
Attorney, Agent, or Firm—Gregory S. Rosenblatt

[57] ABSTRACT

A sabot segment molding apparatus and a method for molding a sabot segment therein, are provided in which wedge-shaped sections of carbon-fiber plies, impregnated with B-stage epoxy or thermoplastic resin, are stacked in a heated arcuate channel. Pressure is applied to the radial surface of the stack by a compression mechanism acting on a novel hinged wing assembly. The hinge pin is secured coaxially in the channel by a support mechanism, so that no vertical downward force is applied to the stack. Instead, a pair of hinged planar wing members rotate around the hinge pin toward each other, and compress the stack of wedge-shaped sections to the desired arcuate shape. The compressed stack is kept under a desired pressure and temperature for a desired period of time until a suitable 120° sabot segment is formed.

8 Claims, 5 Drawing Sheets

SABOT SEGMENT MOLDING APPARATUS AND METHOD FOR MOLDING A SABOT SEGMENT This is a division of application Ser. No. 07/336,445, filed Mar. 10, 1989.

BACKGROUND OF THE INVENTION

1. Field of the invention

The present invention relates to an apparatus and related method for molding a segment of a sabot.

In an effort to achieve higher velocities in projectiles for military use, it has been desirable to reduce the weight of the projectiles by reducing an overall parasitic weight of all discarding components. One method of achieving this features is utilization of advance lightweight composites for manufacturing a sabot. Several methods have been attempted to assemble such a sabot using plies of high strength carbon fiber reinforced plastic.

Several problems have been experienced with past attempts to mold the plies into an acceptable shape of a sabot using conventional compression molding methods and machines. Conventional compression molding is performed by loading a material to be molded into a mold cavity and applying pressure vertically with a mating mold half. This method is acceptable for molding flat objects, or for parts with plies arranged to be perpendicular to the applied pressure. However, when attempting to form a cylindrical sabot segment using carbon fiber reinforced plastic, application of vertical pressure causes the radially aligned plies to buckle and form cavities and voids in the resultant sabot segment. Further, the carbon fibers are bent, thus reducing their load bearing capabilities.

Consequently the only workable method of molding a sabot segment from the carbon fiber reinforced plastic material in the prior art has been to physically connect with epoxy a plurality of plies of various widths to form wedge-shaped sections, then physically connecting with epoxy or film adhesive a plurality of the wedge-shaped sections to one another until an entire sabot is formed. This method, while avoiding the problems of buckled plies and bent fibers associated with conventional molding methods, is extremely slow and not cost effective.

SUMMARY OF THE INVENTION

It is therefore an object of the present invention to provide a method of molding a sabot segment, using a new type of compression molding apparatus, capable of molding a sabot segment in a single step, avoiding the weaknesses of the conventional methods and apparatus.

To achieve the foregoing objects, and in accordance with the purposes of the invention as embodied and broadly described herein, a sabot segment molding apparatus is provided, comprising a base with an elongated substantially semicircular arcuate channel, a hinged wing assembly including an elongated hinge pin pivotally connecting a pair of planar substantially rectangular wing members, hinge pin support means for rigidly fixing the hinge pin coaxially in the arcuate channel, compression means for urging the wing members pivotally around the hinge pin in a direction toward one another in the arcuate channel to compress the sabot segment to a predetermined angular section of the channel, and heating means for heating the sabot segment in the channel.

In accordance with another aspect of the invention, there is further provided a method of molding a sabot segment employing the above broadly-described apparatus, comprising the steps of arranging a plurality of plies of a carbon fiber material to form wedge-shaped sections having a narrow edge and an opposed wide edge, stacking the wedge-shaped sections contiguously in the arcuate channel with the wider edges adjacent the inner circumference of the channel, positioning the hinged wing assembly so that the hinge pin is coaxial with the arcuate channel and the wing members abut the uppermost stacked wedge-shaped members, supporting the hinge pin at opposing sides of the arcuate channel, applying an urging force to the wing members with the compression means, urging the wing members to pivot about the hinge pin and compress the stacked wedge-shaped sections with a predetermined pressure, applying heat to the compressed stack at a predetermined temperature, and maintaining the predetermined temperature and pressure for a predetermined period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
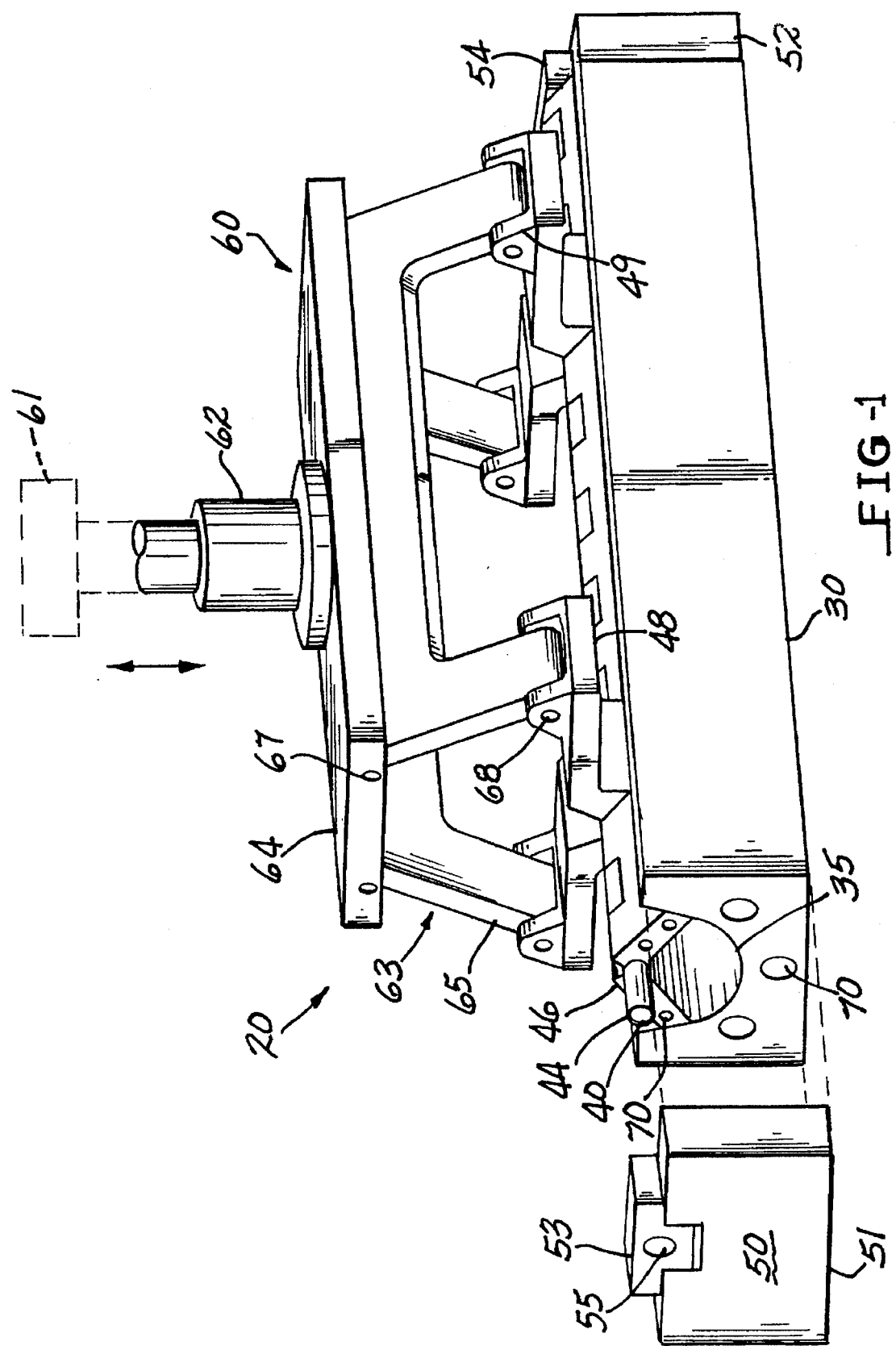
FIG. 1 is a three-dimensional view of a sabot segment molding apparatus incorporating the teachings of the present invention.

Reference will now be made in detail to the present preferred embodiment of the invention, an example of which is illustrated in the accompanying drawings. The preferred embodiment of the sabot segment molding apparatus is shown in FIG. 1 and is represented generally by the numeral 20. This apparatus includes a base 30, a hinged wing assembly 40, including a hinge pin 44 and wing members 46, a hinge pin support means 50 for rigidly fixing the hinge pin, compression means 60 for urging the wing members, and heating means 70 for heating the sabot segment.

As embodied herein, base 30 comprises an elongated generally rectangular structure. An arcuate substantially semicircular channel 35 is disposed in an upper surface of the base. Arcuate channel 35 has a central axis, a predetermined length, and a predetermined diameter.

In accordance with the invention, hinged wing assembly 40 is provided to be positioned in arcuate channel 35 of base 30 in order to mold the sabot segment. As embodied herein, hinged wing assembly 40 includes an elongated hinge pin 44, which is positioned coaxially with the central axis of arcuate channel 35. Hinge pin 44 has a predetermined length greater than the predetermined length of arcuate channel 35, and has ends projecting past the ends of base 30 as shown, for example, in FIG. 1. A pair of planar substantially rectangular wing members 46 are hingedly pivotally attached to hinge pin 44. Wing members 46 have a predetermined length substantially equal to the length of arcuate channel 35 and a total width, or wing span, substantially equal to the predetermined diameter of arcuate channel 35. Further, wing members 46 are configured with a set of planar extended cantilevered arm portions 48 projecting generally diagonally away from wing members 46 from a plurality of different locations along the length thereof, configured at the ends thereof with clevis brackets 49. The function of extended portions 48 will be described hereinafter.

Still referring to FIG. 1, and as embodied herein, hinge pin support means 50 comprise a pair of rectangular block assemblies, 51 and 52 respectively, each having an upper portion, 53 and 54 respectively. The upper portions each contain an aperture, 55 and 56 respectively, configured to receive the projecting ends of hinge pin 44. Block assemblies 51 and 52 can be slidably mounted abutting base 30, with the ends of hinge pin 44 projecting through apertures 55 and 56. Hinge pin 44 is thus rigidly supported coaxially with the central axis of arcuate channel 35, and is not free to move from this coaxial position.

In accordance with the invention, there is provided compression means 60 for urging wing members 46 to pivot around hinge pin 44 in arcuate channel 35. As here embodied, compression means 60 includes a motor means 61 which may be, for example, a hydraulic motor for creating an urging force. Piston means 62 are provided for translating the urging force from motor means 61 to a frame generally referred to as 63, comprising an upper planar plate 64, and a pair of generally vertically disposed toggle plates 65, rotatably connected at the edges of planar plate 64, with toggle plate hinge mechanisms 67 at one end, and rotatably connected to extended portions 48 of wing members 46 at the other end with clevis pins 68 inserted through clevis brackets 49.

In accordance with the invention there is further provided heating means 70 for heating the sabot segment while in the channel. As embodied herein, heating means 70 includes a plurality of elongated heating elements, for example, ceramic cartridge heaters, disposed at various locations within base 30 and wing members 46 substantially parallel to the central axis, to provide a uniform heating capability to arcuate channel 35.

Figure 2:
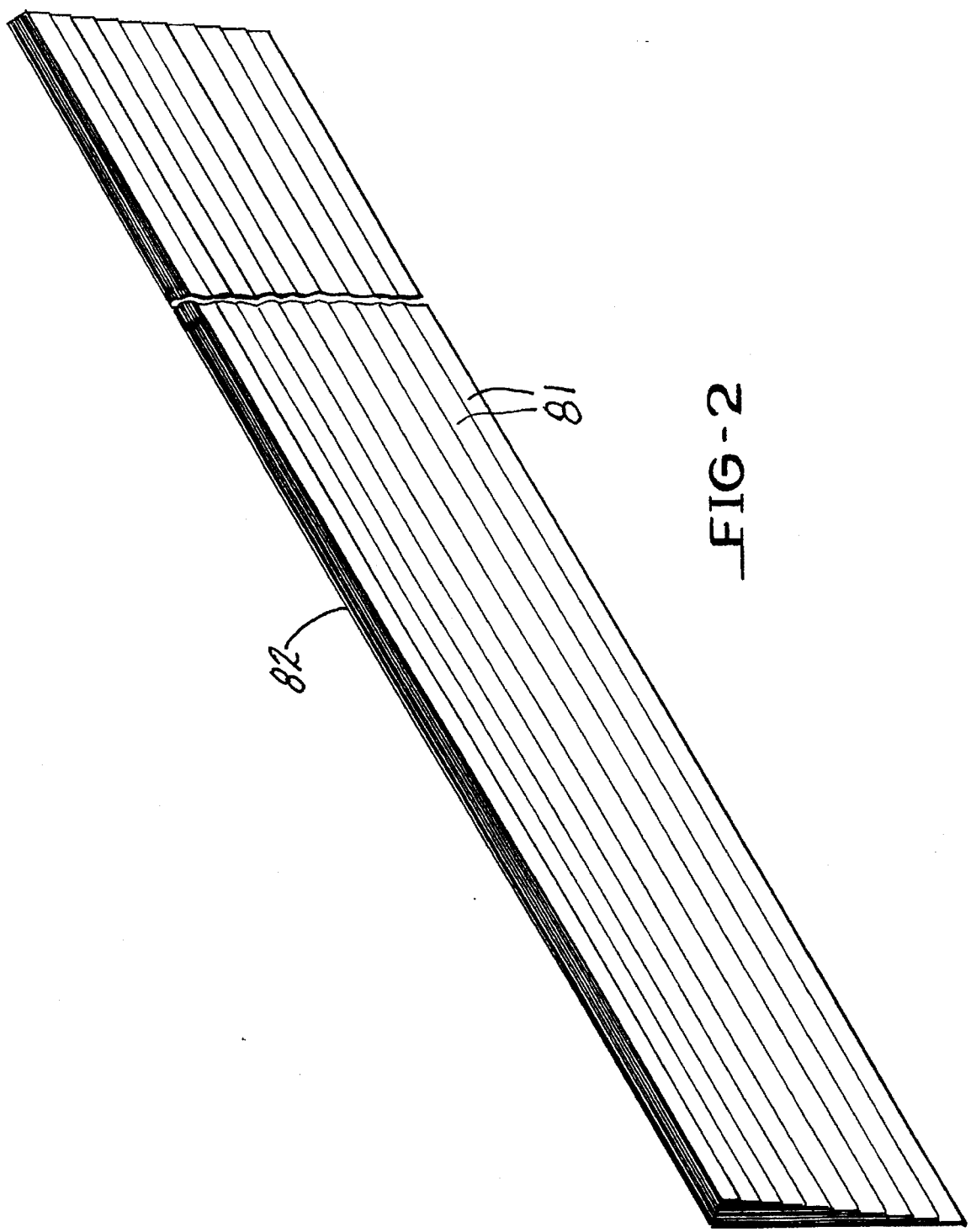
FIG. 2 is an isometric view of a wedge-shaped section formed of a plurality of plies of the sabot segment material, in accordance with the method taught by the present invention.
Figure 3:
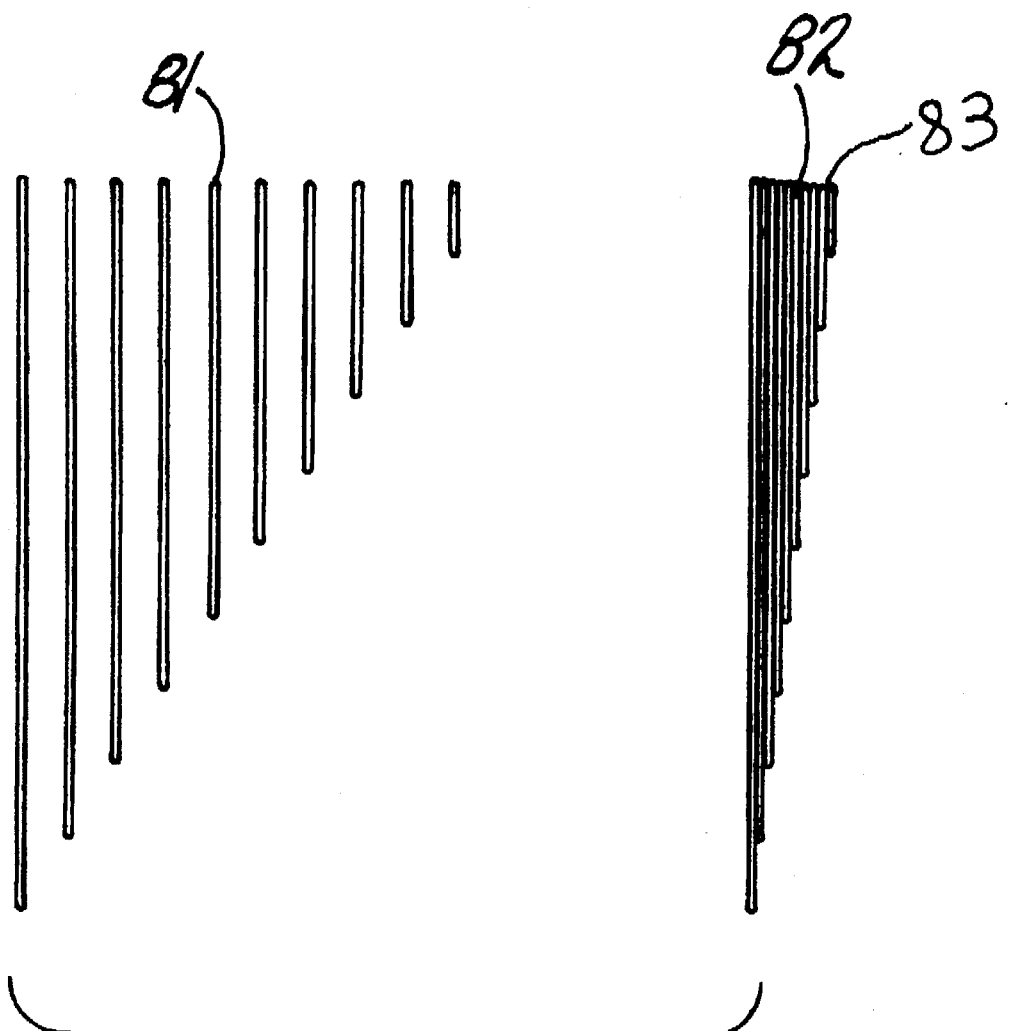
FIG. 3 is a magnified end view of the wedge-shaped section of FIG. 2.

Molding a sabot segment is performed substantially as follows. A plurality of unidirectional tape plies 81 of various widths are selected. Such tape plies may be, for example and not by way of limitation, unidirectional tape plies having carbon fibers preimpregnated with an uncured B-stage epoxy, or preimpregnated with a thermal plastic resin. As shown generally in FIG. 2 and FIG. 3, tapes 81 are laid out with pieces of consecutively smaller widths in contiguous relationship to form a generally wedge-shaped section, 82, being wider at an outside edge than at an inside edge, with flanks or sides of the wedge-shaped section being radial surfaces 83.

Figure 4:
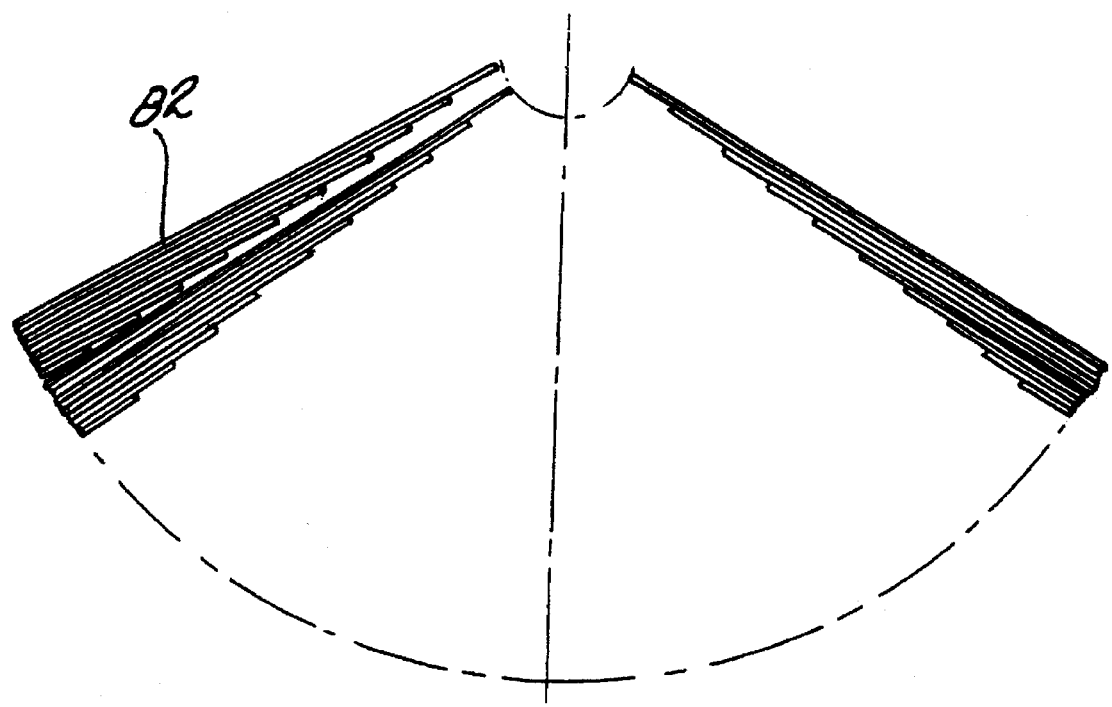
FIG. 4 is an end view illustrating a positioning of the stacked wedge-shaped sections of FIG. 2 in the arcuate channel in accordance with the present invention.

Referring now to FIG. 4, a plurality of wedge-shaped sections 82 are placed in arcuate channel 35 of sabot segment molding apparatus 20. The alignment configuration shown in FIG. 4 has several advantages. By varying the internal radius by incremental amounts, wedge-shaped section 82 is increasing generally at an angle, for example, of 1¼°, can be fabricated. Further, by stacking wedge-shaped sections 82 with the wider edge portions at an inner circumference of the arcuate channel, air gaps between individual tape plies 81 and individual wedge-shaped sections 82 are minimized when the stack is compressed.

Figure 5:
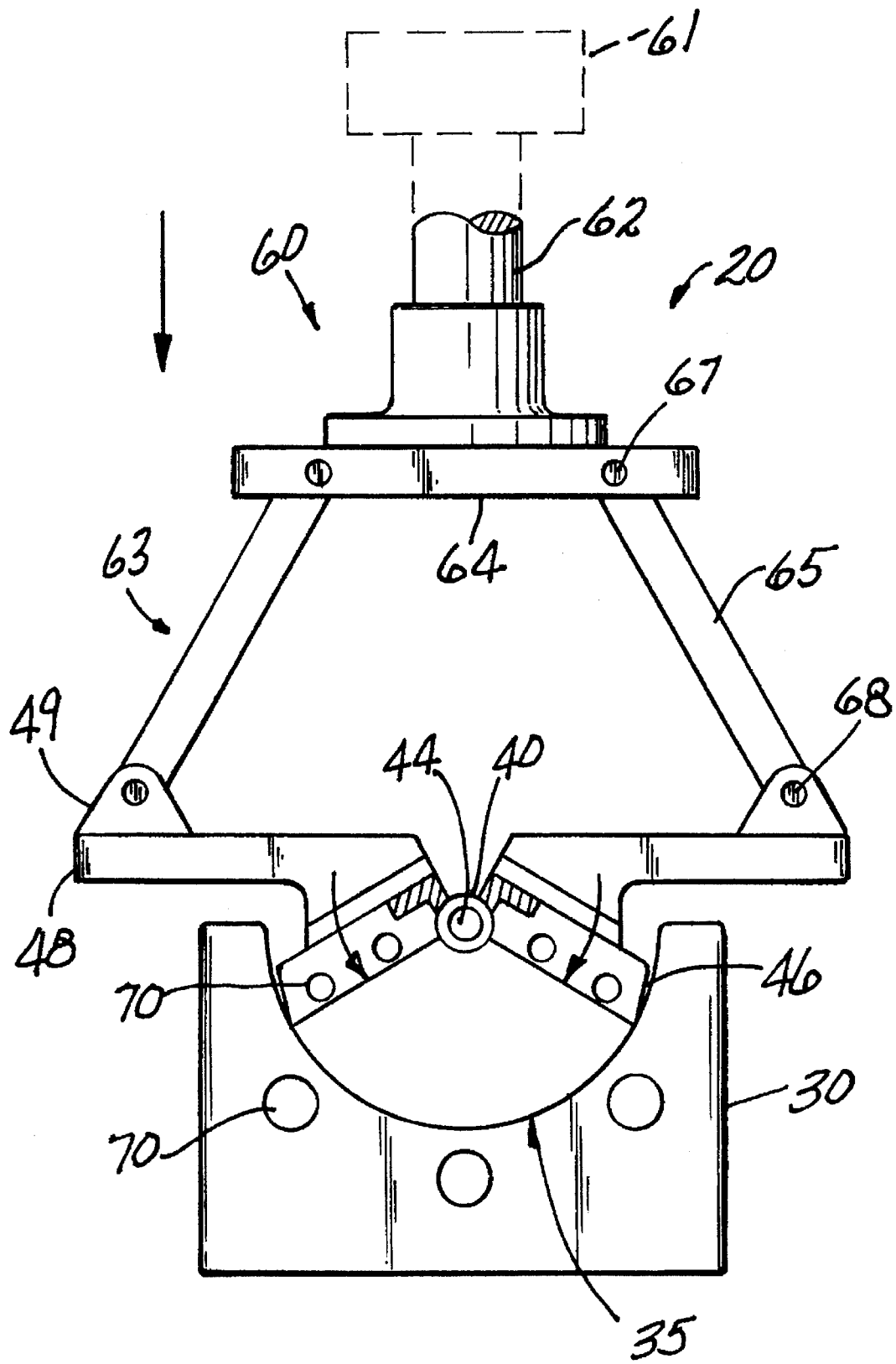
FIG. 5 is an end view of the apparatus of FIG. 1, showing the operation thereof.

In accordance with the invention, as broadly described herein, sabot segment molding apparatus 20 is now operated as shown generally in FIG. 5. Hinged wing assembly 40 is positioned above wedge-shaped sections 82 stacked radially in arcuate channel 35, so that hinge pin 44 is coaxial with the central axis thereof. Hinge pin support blocks 51 and 52 are slidably mounted at either end of base 30, so that the projecting ends of hinge pin 44 are rigidly mounted in apertures 55 and 56.

In accordance with the invention, an urging force is applied to wing members 46 in order to compress stacked wedge-shaped members 82 into a sabot segment. Motor means 81 is actuated and heating elements 70 are energized. Piston means 62 apply the urging force to upper planar plate 64. Toggle plates 65 which are connected to upper planar plate 64 by toggle plate hinge mechanisms 67 are consequently forced down. The urging force is then transmitted to extended portions 48 through clevis brackets 49. Extended portions 48 rotate on clevis pins 68, essentially acting as moment arms to multiply the urging force by the length of extended portion 48, and transfer the multiplied urging force to wing members 46.

As broadly described herein, hinge pin 44 is held rigidly in place by support blocks 51 and 52, and thus applies no component of the downward urging force to the stacked wedge-shped structure in arcuate channel 35. Wing members 46, however, rotate towards each other around hinge pin 44 under the influence of the applied urging force. Wing members 46 come in contact with radial surfaces 83 of the outermost stack of wedge-shaped sections and transmit the urging force thereto, thus compressing the entire stack of wedge-shaped sections 82 into the predetermined angular sector of the arcuate channel, thus forming the sabot segment. The sabot segment is kept under pressure and heat for a predetermined length of time until the molding cycle is completed. Finally, piston means 62 are retracted, the urging force applied to wing members 46 is relieved, heating elements 70 are de-energized, and the completed sabot segment is removed from arcuate channel 35.

During experimentation with the apparatus of the present invention and using the general method of molding a sabot segment broadly described above, it has been determined that by using seventy-two (72) of the wedge-shaped sections, a 90° sabot segment is produced. Further, ninety-six (96) of the wedge-shaped sections can be used to form a 120° sabot segment. During this experiment, heating element 70 applied a temperature of 350° F. to the compressed stack of wedge-shaped sections, a pressure of 600 psi was applied by wing members 46, and the pressure and heat were applied for two hours. An acceptable sabot segment was thus produced.

Additional advantages and modifications will readily occur to one skilled in the art. The apparatus and method broadly described herein are, therefore, not limited to the specific details, representative apparatus, preferred embodiment, and illustrative example shown and described. Accordingly, departures may be made from such details without departing from the spirit or scope of applicant's general invention.

What is claimed is:

1. A method of molding a sabot segment using a sabot segment molding apparatus, comprising the steps of:

arranging a plurality of plies of a carbon fiber material to form wedge-shaped members having a narrow edge and an opposed wide edge;

stacking said wedge-shaped members contiguously in an elongated arcuate channel with a central axis and a predetermined diameter, with said wider edges adjacent the inner circumference of the channel, so that said narrow edges of the contiguous wedges are disposed to form an arcuate portion at a distance apart from said central axis;

positioning a hinged wing assembly with a hinge pin coaxially aligned with said central axis, and a pair of planar substantially rectangular wing members abutting the uppermost stacked wedge-shaped members;

supporting said hinge pin at opposing ends of the arcuate channel;

applying a predetermined urging force on said wing members, urging said wing members to pivot about said hinge pin toward one another and compressing the stack of wedge-shaped members with a predetermined pressure;

applying a predetermined temperature to the compressed stack of wedge-shaped members; and maintaining said pressure and temperature for a predetermined period of time.

2. The method of claim 1, wherein the step of arranging includes arranging plies of a carbon fiber epoxy impregnated tape material.

3. The method of claim 1, wherein the step of arranging includes arranging plies of a thermoplastic resin material.

4. The method of claim 1, wherein the step of stacking includes positioning wedge-shaped members to have an inner arcuate surface having a radius at least equal to the predetermined radius of the hinge pin.

5. The method of claim 1, wherein the step of compressing forms a sabot segment having an arcuate section of up to 120°.

6. The method of claim 1, wherein the step of heating includes heating the stack with a predetermined temperature of at least 350° F.

7. The method of claim 1, wherein the step of compressing includes compressing the stack with a predetermined pressure of at least 600 psi.

8. The method of claim 1, wherein the step of compressing includes compressing the stack for a predetermined period of time of at least two hours.

* * * * *